United States Patent [19]

Stadler et al.

[11] Patent Number: 4,964,478

[45] Date of Patent: Oct. 23, 1990

[54] ELECTRONIC BALANCE WITH SCALE ON TOP

[75] Inventors: Eberhard Stadler; Matthias Eger, both of Göttingen; Franz-Josef Melcher, Hardegsen; Veronika Martens, Göttingen, all of Fed. Rep. of Germany

[73] Assignee: Sartorius AG, Göttingen, Fed. Rep. of Germany

[21] Appl. No.: 448,501

[22] Filed: Dec. 11, 1989

[30] Foreign Application Priority Data

Dec. 10, 1988 [DE] Fed. Rep. of Germany ....... 3841674

[51] Int. Cl.⁵ ..................... G01G 3/08; G01G 21/24
[52] U.S. Cl. .................................. 177/229; 177/255
[58] Field of Search ............................. 177/229, 255

[56] References Cited

U.S. PATENT DOCUMENTS

| | | | |
|---|---|---|---|
| 4,300,648 | 11/1981 | Gallo et al. | 177/255 X |
| 4,501,160 | 2/1985 | Johnson | 177/229 X |
| 4,738,324 | 4/1988 | Borchard | 177/255 X |
| 4,848,477 | 7/1989 | Oldendorf et al. | 177/255 X |

Primary Examiner—George H. Miller, Jr.
Attorney, Agent, or Firm—Eric P. Schellin

[57] ABSTRACT

An electronic balance with scale on top and with parallel guide rods whereby corner-load errors can be corrected by means of the inclusion of at least one leaf spring which is fastened to a load receiver and is supported on the other end on a fixed point of the housing. The magnitude of the correction can be adapted to the corner-load error of the unadjusted parallel guide by means of the selection of the spring stiffness of the leaf spring and/or by means of its effective length.

7 Claims, 6 Drawing Sheets

ELECTRONIC BALANCE WITH SCALE ON TOP

BACKGROUND OF THE INVENTION

The invention relates to an electronic balance with a scale on the top, with a housing and with a load receiver which is connected via an upper guide and a lower guide in the form of a parallel guide in a resilient fashion to points fixed to the housing.

Balances of this type are generally known and described e.g. in DE-OS No. 34 22 042 and U.S. Pat. No. 4,798,251. The corner-load correction or off center correction, that is, the compensation to the same display results independently of the location of the material being weighed on the balance scale, takes place thereby either by means of adjusting devices which vary the vertical position of one of the guides relative to the other guide or by means of removing material in the area of one of the moving joints, which varies the vertical position of the effective points of rotation of the guides relative to each other in the same manner. These methods of corner-load correction, for instance, require either the expense of an appropriate adjusting device or they permit an adjustment in only one direction, so that an exact correction requires much experience. In addition, several adjacent milled recesses are necessary to eliminate non-linear corner-load errors like those described e.g. in U.S. Pat. No. 4,505,345, which milled recesses additionally complicate the corner-load correction. It is also known from DE-OS No. 30 03 862 that a corner-load sensor can be placed on the parallel guide, the output signal of which sensor corrects the extant corner-load error within the electronic circuitry. However, this requires additional sensors and a corresponding further processing of measured values.

The invention therefore has the objective of indicating a simplified possibility of corner-load correction which also permits the adjustment of non-linear corner-load errors.

SUMMARY OF THE INVENTION

The invention solves this objective in that at least one additional leaf spring is provided between the load receiver and the points fixed to the housing for corner-load correction and that the effective spring constant of the leaf spring can be varied. This additional leaf spring acts as a result thereof as a corner-load correction means so that in the case of an off-center loading of the balance scale, the latter is positioned somewhat obliquely together with the load receiver, therewith varying the reaction force of the leaf spring on the load receiver in accordance with its position. This variation of force is only a function of the spring constant and not of the magnitude of the spring force. The function of this leaf spring for corner-load correction differs therewith distinctly from the function of a tare spring like that known e.g. from DE-OS No. 25 56 117, which compensates initial loadings on the balance scale by means of its spring force. In the case of a leaf spring, the spring constant can be varied relatively simply; moreover, its low overall height (in comparison to a vertical spiral spring) allows it to be readily housed in the flat housings of customary electronic balances.

The spring constant of this (these) leaf spring(s) for corner-load correction is generally small in comparison to the vertical spring constant of the parallel guide. In addition, the correction is held so small that undesired variations of other parameters such as e.g. the temperature behavior can be disregarded.

BRIEF DESCRIPTION OF THE DRAWINGS

The invention is described in the following with reference made to the schematic figures.

DETAILED DESCRIPTION OF THE INVENTION

Figure 1:
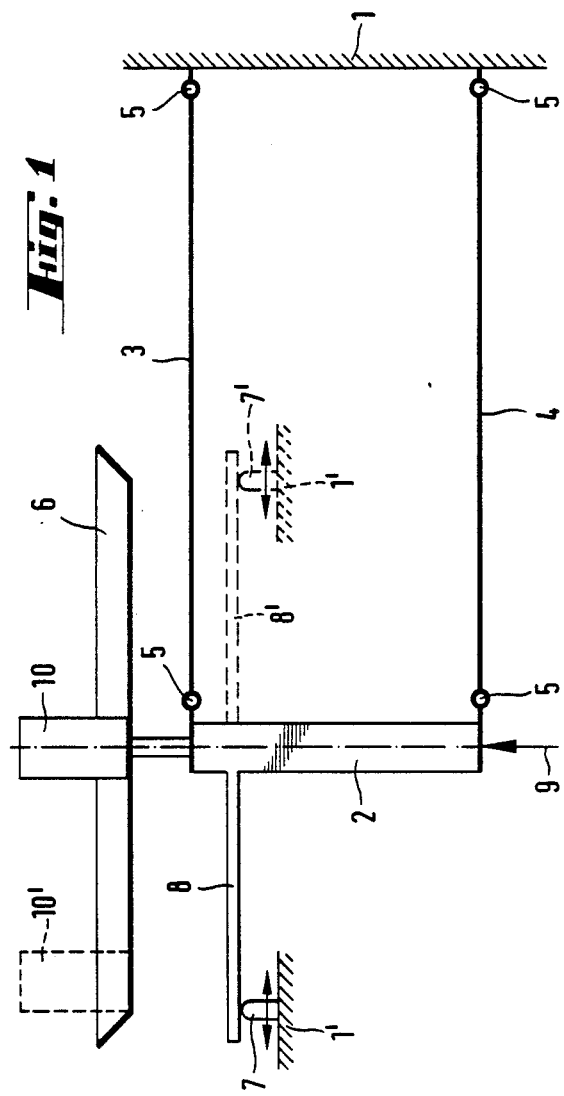
FIG. 1 shows a diagrammatic sketch for explaining the principle of operaton.

The diagrammatic sketch in FIG. 1 shows a parallel guide which consists of two guides 3, 4 with moving joints 5 and connects load receiver 2 to points 1 fixed to the housing. Load receiver 2 carries balance scale 6 on its top. Leaf spring 8 is attached at the side of load receiver 2 and rests on point 7' fixed to the housing. If load 10 is placed in the middle, the weight is compensated by the opposing force (arrow 9) of any desired measuring system (not shown) without a torque having to be absorbed by guides 3, 4. If load 10' is placed off-center, a torque arises which is absorbed by guides 3, 4 and which results in a slight oblique positioning of load receiver 2 and of balance scale 6 relative to the housing. This oblique positioning is transferred to leaf spring 8.

This results, in accordance with the spring constant of leaf spring 8, in a variation of the spring force on load receiver 2 which decreases the force of the weight and results in a lesser value in the display. However, if weight 10 is located on the right side of balance scale 6 in FIG. 1, then the leaf spring generates a lesser additional force in a corresponding manner, which causes the value in the display to become greater. Leaf spring 8 shown in FIG. 1 thus corrects the corner-load errors of a parallel guide which displays higher values in an unadjusted state with weights on the left of the balance scale than when they are in the middle of the balance scale and displays lower values when weights are on the right on the balance scale than when they are in the middle of the balance scale.

The magnitude of the correction is a function of the spring stiffness of leaf spring 8 (but not of the spring pretension, since only the change of force between a centrally placed weight and a weight placed off-center is important for a corner-load correction; the spring pretension is therefore selected to be as low as possible and also of its effective length. A corner-load adjustment can therefore take place via one of these parameters; for example, a rough adjustment can be performed by means of the selection of a leaf spring with a certain spring stiffness and a fine adjustment by means of laterally shifting support point 7 fixed to the housing.

If a parallel guide with inverted corner-load behavior (weight left: low display, weight right: high display) is to be corrected, then the leaf spring must be placed on position 8' shown in dotted lines. For the direction vertical to the drawing plane in FIG. 1, there is the possibility of adjustment in a corresponding manner by means of a leaf spring running vertically to the drawing plane. The adjustment of the two orthogonal directions of the corner load on the balance scale can also take place by means of a single leaf spring which must run e.g. obliquely to the left and to the rear of the unadjusted parallel guide displays higher values both to the left and also to the rear (behind the drawing plane) on the balance scale than in the middle.

In addition to the operating principle described above, a non-linear corner-load behavior can also be corrected by means of several leaf springs in accordance with the invention. Thus, two equal leaf springs 8, 8' with the same distance of the support point fixed to the housing should actually cancel each other out in their action; however, it turned out that this is only true for the linear corner-load component whereas for the non-linear components a resulting action remains so that both the linear as well as the non-linear corner-load errors can be corrected by means of several springs.

FIGS. 2 to 5 show practical embodiments of the principle explained above.

Figure 2:
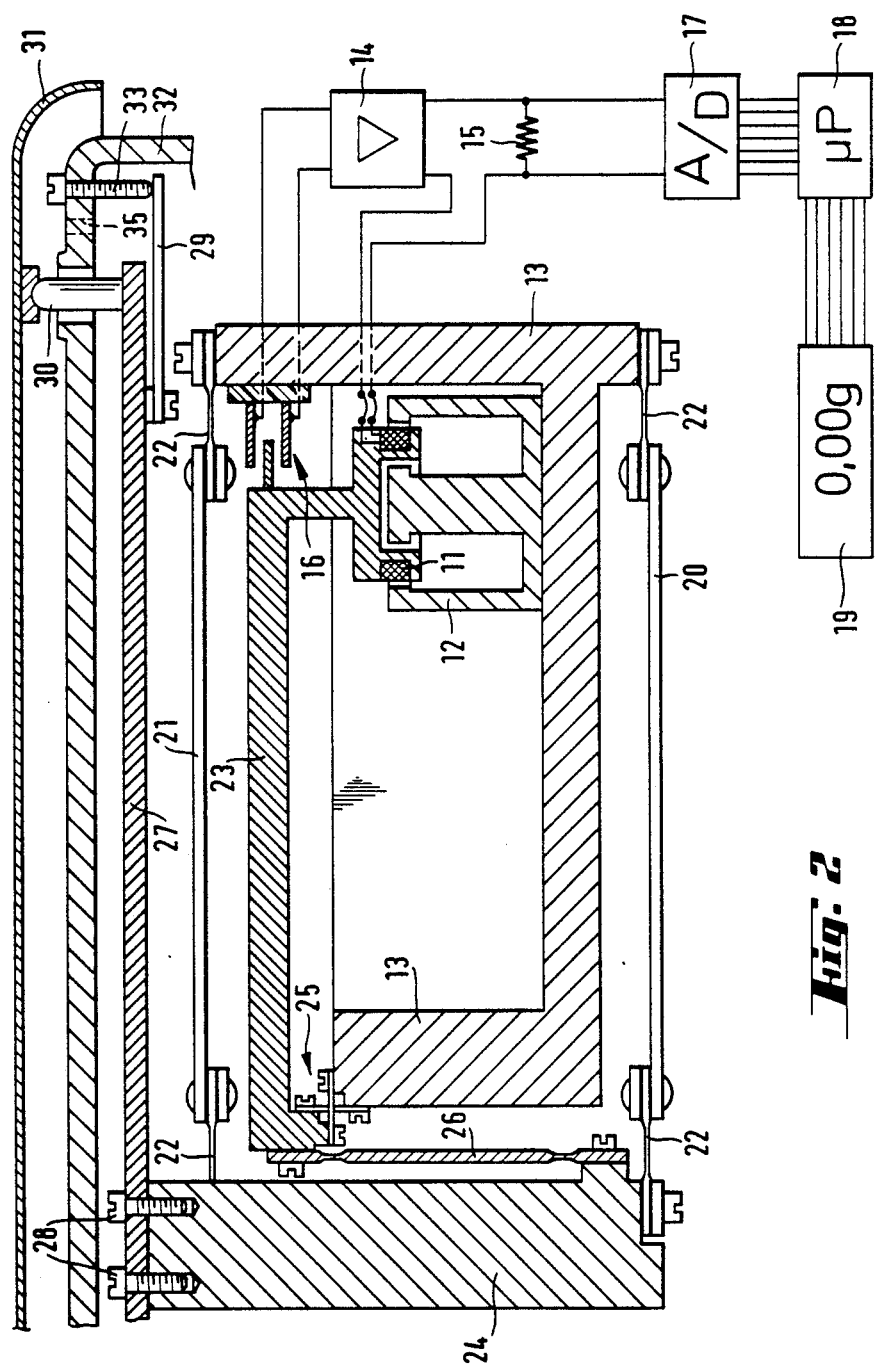
FIG. 2 shows a first embodiment.

FIG. 2 shows a balance with electromagnetic compensation of force in section. Guides 20, 21 are fastened to system carrier 13 fixed to the housing with moving joints 22 and form a parallel guide for load receiver 24. A smooth (can be ribbed) sheet 27 is screwed fast to load receiver 24 by means of screws 28. Balance scale 31 is supported on this sheet 27 via intermediary elements 30. FIG. 2 also shows a coupling element 26 which transfers the weight force onto the shorter lever arm of translation lever 23. Translation lever 23 is mounted by means of cross spring joint 25 on system carrier 13 and carries coil 11 of the electromagnetic compensation of force on its longer lever arm. Coil 11 extends into the air gap of permanent magnet 12. The current through the coil is regulated thereby in a known manner by position sensor 16 and control amplifier 14 in such a manner that equilibrium of force prevails. The coil current is converted at precision resistor 15 into a voltage signal, digitized in A/D converter 17, processed further in digital signal-processing unit 18 and displayed in display 19. The operation of the balance was described only quite cursorily in the above since it is generally known. Leaf spring 29 is screwed fast to sheet 27 for corner-load adjustment. This leaf spring presses gently against screw 33 fixed to the housing as support point. Upper housing part 32 of the housing is only indicated and is connected in a manner which is not shown by system carrier 13. The mode of operation of the leaf spring has already been explained with reference made to FIG. 1. A corner-load correction is carried out in a rough manner by means of the selection of the spring stiffness of the leaf spring and a fine adjustment is possible by screwing screw 33 into one of several holes present in upper housing part 32, which changes the active length of leaf spring 29. One of these holes 35 is sketched in dotted lines in FIG. 2. A fine adjustment is accordingly possible from the outside after the mounting of the weighing system into the housing. The adjustment of the corner load in a direction vertical to the drawing plane takes place by means of a further spring which is not shown. Likewise, other leaf springs can be built in e.g. on the left side of sheet 27 for the adjustment of non-linear corner-load effects.

Figure 3:
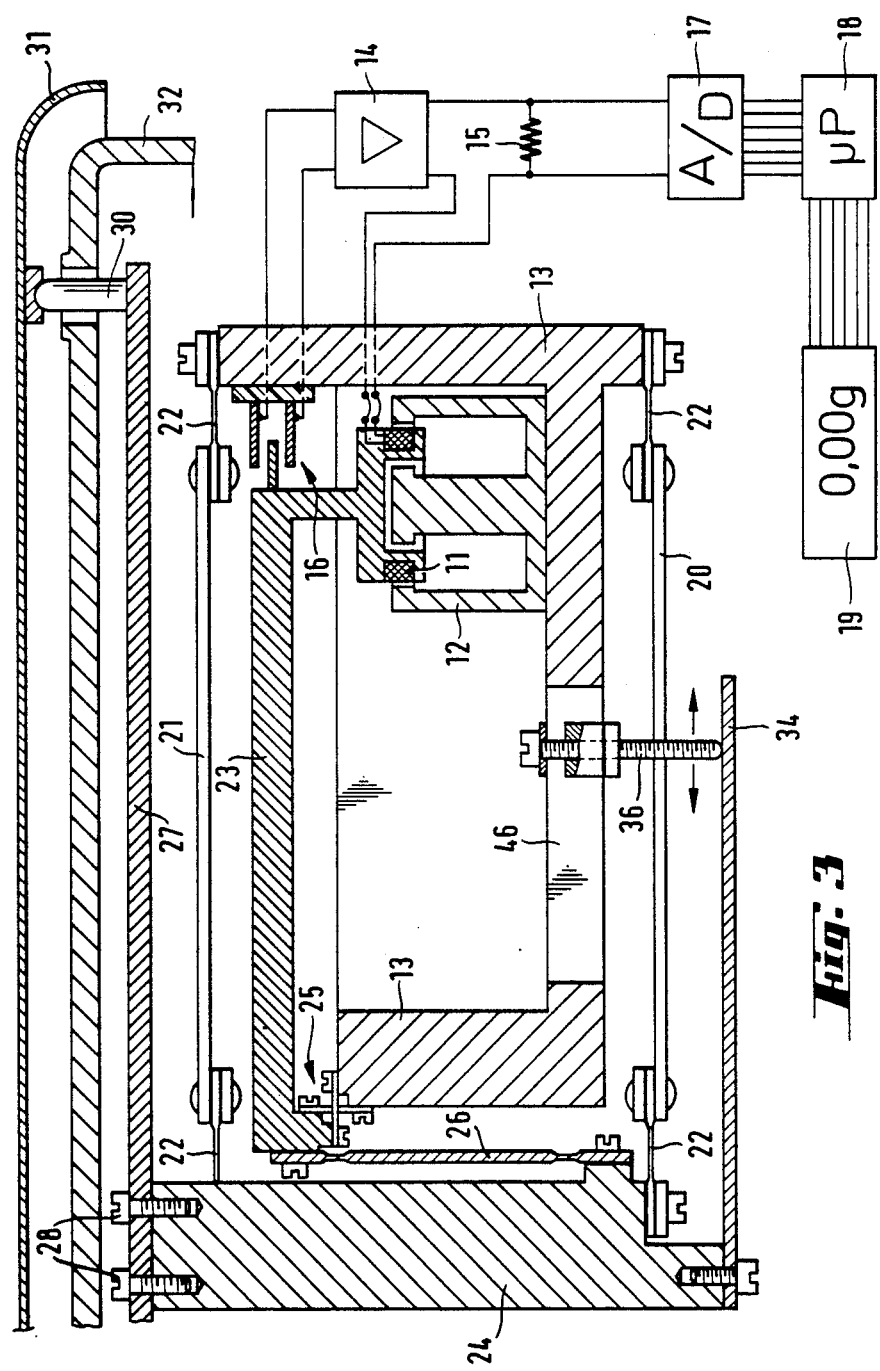
FIG. 3 shows a second embodiment.

The embodiment of FIG. 3 differs from that of FIG. 2 only in the manner of the placing of the corner-load correction spring. The parts which are the same as in FIG. 2 are therefore characterized with the same reference numerals and are not explained again. Corner-load correction spring 34 is screwed fast in FIG. 3 at the lower end of load receiver 24. It presses against a screw 36 which can be shifted in slot 46, which changes the active length of leaf spring 34. An intentional slight non-parallelism of guides 20, 21 assures that a corner load of a plus or minus sign appears in an unadjusted state so that the shifting range to the right of load receiver 24 in FIG. 3 is sufficient for a correction.

Figure 4:
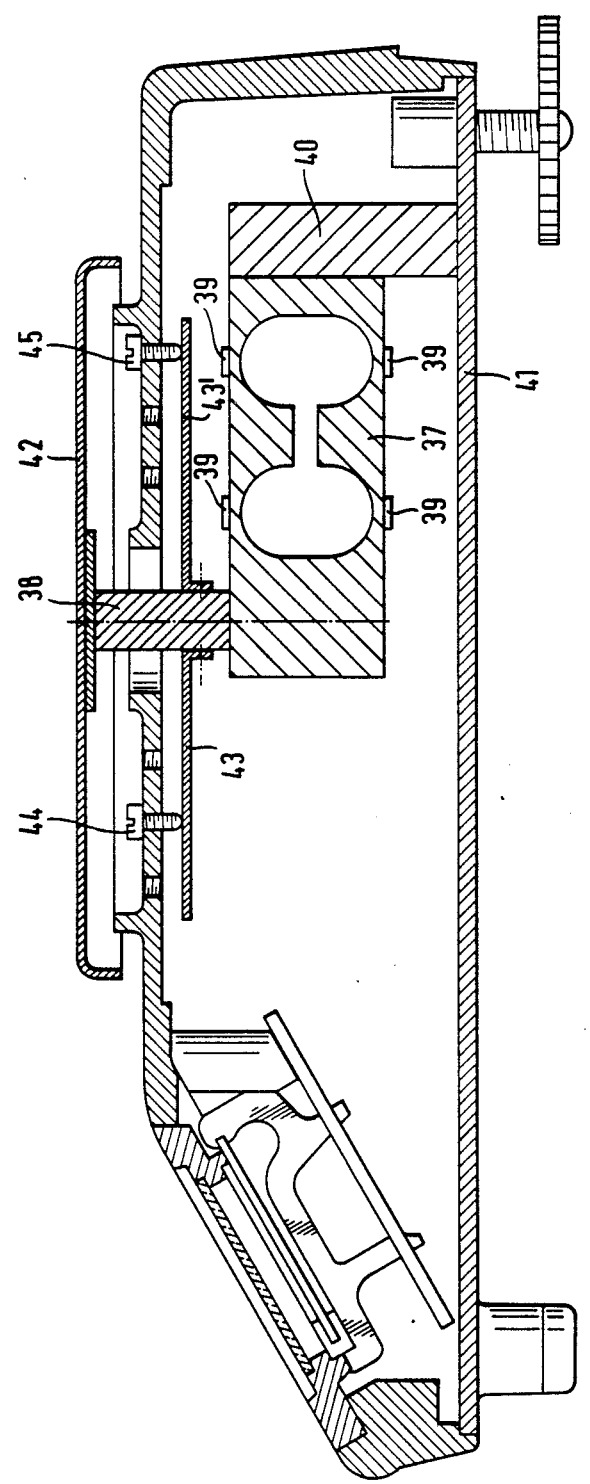
FIG. 4 shows a third embodiment.

FIG. 4 shows an embodiment with a wire strain gauge measuring system in section. Part 37 forms the parallel guide for load receiver 38 and carries wire strain gauges 39 at its thin areas. On the opposite side, part 37 is connected via support 40 to lower housing part 41. Load receiver 38 carries balance scale 42 on its top. Load receiver 38 comprises a leaf spring 43 for corner-load correction. The effective length of leaf spring 43 is determined by a screw 44, whereby several holes are available for selection for this screw again, as indicated in FIG. 4. Furthermore, a second leaf spring 43' is built in whose effective length is determined by screw 45. For the adjustment of the linear corner-load error, only the difference of the actions of the two leaf springs 43, 43' is operative—both leaf springs together correct even non-linear corner-load errors.

The corner-load adjustment in the direction orthogonal to the drawing plane takes place in the same manner by means of leaf springs orthogonal to the drawing plane.

Figure 5:
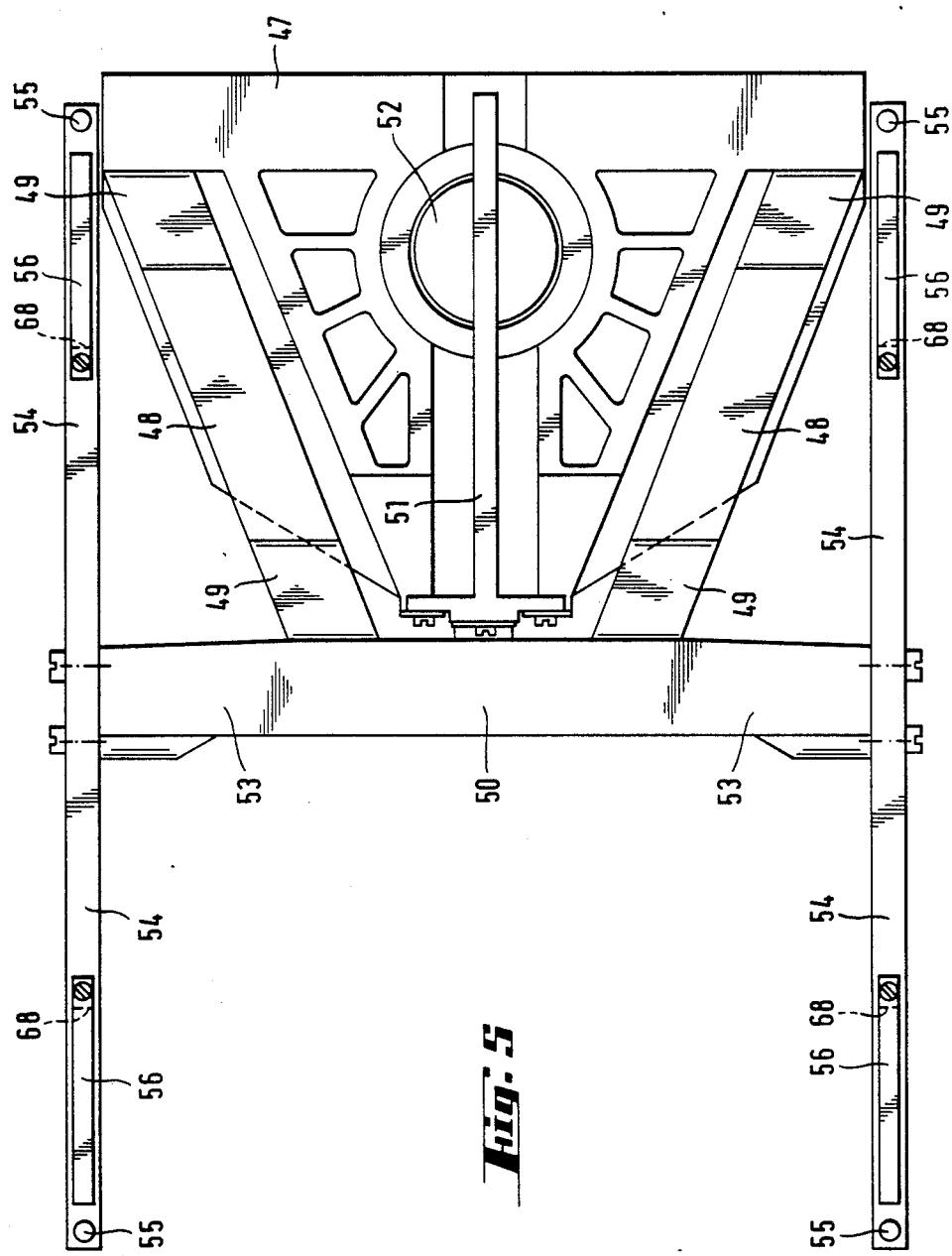
FIG. 5 shows a fourth embodiment.

A further embodiment is shown in FIG. 5 in a top view. In this embodiment, part 47 of the parallel guide fixed to the housing, guides 48 with their thin areas 49 and load receiver 50 with its lateral projections 53 are manufactured from one piece. Lateral projections 53 carry cross struts 54 at their ends, which for their part carry support points 55 for the balance scale (not shown). A total of four leaf springs 56 are screwed fast to cross struts 54 with spacers and press against screws on the upper housing part in the same manner as sketched in FIGS. 2, 4. FIG. 5 also shows a translation lever 51 with coil 52 of electromagnetic compensation of force.

Figure 6:
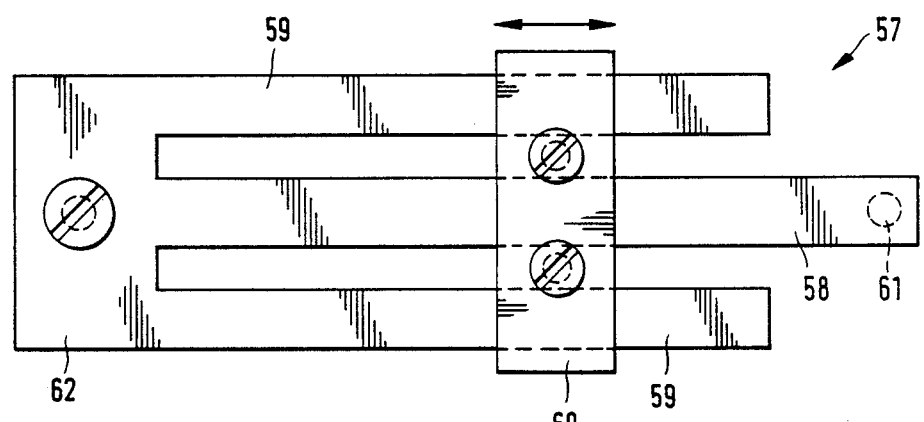
FIG. 6 shows a leaf spring in a first embodiment.

Rectangular strips of metal sheeting consisting of a spring material can be used as leaf springs in all embodiments shown. An adjustment of the spring constant is possible thereby in a known manner if the leaf spring consists of two partial springs which rest on one another and are connected to one another by means of two shiftable coupling pieces. Other possible embodiments are shown by way of example in FIGS. 6 and 7. The leaf spring 57 in FIG. 6 consists of a cental web 58 and two lateral webs 59. The leaf spring is fastened to the load receiver at the common root 62 of the webs. The support point on the housing is designated by 61 and indicated in dotted lines. The three webs are connected by shiftable clamping piece 60, as a result of which the spring constant of leaf spring 57 can be varied.

Figure 7:
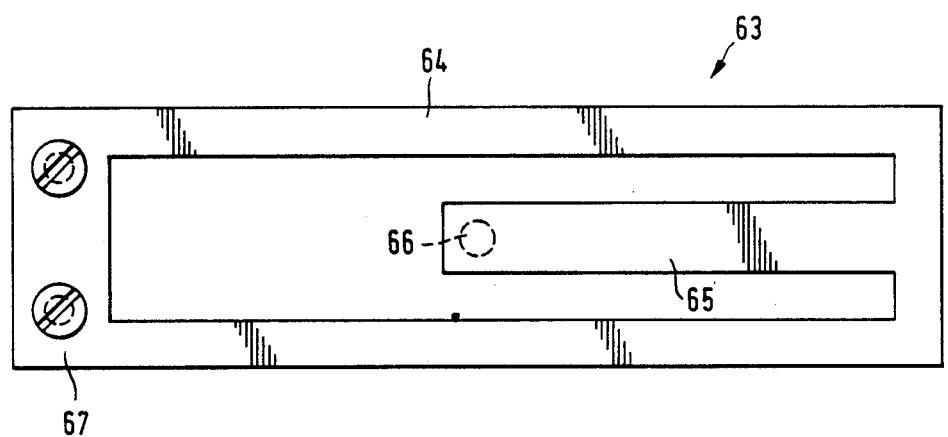
FIG. 7 shows a leaf spring in a second embodiment.

Leaf spring 63 shown in FIG. 7 consists of circumferential frame 64 and returning web 65. The fastening of the leaf spring takes place in area 67 and the stop fixed to the housing attacks point 66. Both circumferential frame 64 and returning web 65 are resiliently designed. The spring constant is independent of light deviations of the point of attack in the area of point 66, given an appropriate dimensioning of the web widths.

The embodiments shown in FIGS. 2 to 5 are of course only to be viewed as examples of how the principle of corner-load adjustment explained for FIG. 1 can be transformed as regards the design. The same applies to the embodiments of the leaf springs shown in FIGS. 6, 7. For example, the leaf spring can be fastened in all embodiments of the balance to the housing and press loosely against the load receiver. Or, the leaf spring can be supported on the bottom plate of the housing (instead of an the upper housing part).

We claim:

1. An electronic balance with a scale on top with a housing and with a load receiver which is connected via an upper guide and a lower guide in the form of a parallel guide means in a resilient fashion to points fixed to the housing, comprising at least one leaf spring is provided between the load receiver and the points fixed to the housing for corner-load correction and that the effective spring constant of the leaf spring can be varied.

2. The electronic balance with scale on top according to claim 1, wherein at least one leaf spring is provided between the load receiver and points fixed to the housing for each of two orthogonal directions of the corner load on the balance scale.

3. The electronic balance with scale on top according to claim 1, wherein the leaf springs are formed by resilient, lateral projections of the load receiver.

4. The electronic balance with scale on top according to claim 1 wherein the leaf springs can be screwed on.

5. The electronic balance with scale on top according to claim 4, wherein the leaf springs include several webs.

6. The electronic balance with scale on top according to claim 5, wherein the leaf springs comprise a returning web.

7. The electronic balance with scale on top according to claim 6, wherein a shiftable clamping piece bridges the said webs.

* * * * *